United States Patent
Miller et al.

(10) Patent No.: US 7,765,195 B2
(45) Date of Patent: Jul. 27, 2010

(54) TRIMMED AND MERGED SEARCH RESULT SETS IN A VERSIONED DATA ENVIRONMENT

(75) Inventors: Patrick C. Miller, Sammamish, WA (US); W. Bruce Jones, Redmond, WA (US); William J. Griffin, Sammamish, WA (US); David R. Quick, Bellevue, WA (US); Naresh Kannan, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 224 days.

(21) Appl. No.: 11/593,809

(22) Filed: Nov. 7, 2006

(65) Prior Publication Data

US 2008/0109427 A1 May 8, 2008

(51) Int. Cl.
- *G06F 17/00* (2006.01)
- *G06F 13/30* (2006.01)
- *G06F 7/00* (2006.01)

(52) U.S. Cl. .................. 707/695; 707/732; 707/759; 707/783

(58) Field of Classification Search ............... 707/5, 707/695, 732, 759, 783
See application file for complete search history.

(56) References Cited

U.S. PATENT DOCUMENTS

| | | | |
|---|---|---|---|
| 2004/0205473 A1* | 10/2004 | Fisher et al. | 715/500 |
| 2005/0038775 A1 | 2/2005 | Haveliwala et al. | |
| 2005/0050023 A1 | 3/2005 | Gosse et al. | |
| 2005/0108001 A1* | 5/2005 | Aarskog | 704/10 |
| 2005/0131909 A1 | 6/2005 | Cavagnaro et al. | |
| 2005/0131964 A1 | 6/2005 | Saxena | |
| 2005/0149500 A1 | 7/2005 | Marmaros et al. | |
| 2005/0278293 A1 | 12/2005 | Imaichi et al. | |
| 2006/0031206 A1 | 2/2006 | Deubel et al. | |
| 2006/0224626 A1 | 10/2006 | Lakshminath et al. | |
| 2008/0072290 A1* | 3/2008 | Metzer et al. | 726/3 |
| 2008/0077570 A1* | 3/2008 | Tang et al. | 707/5 |

FOREIGN PATENT DOCUMENTS

CA 2303466 A1 9/2001

OTHER PUBLICATIONS

Bober et al., "Multiversion Query Locking", Date: 1992, http://www.vldb.org/conf/1992/P497.PDF.

(Continued)

*Primary Examiner*—Khanh B Pham
*Assistant Examiner*—Navneet K Ahluwalia

(57) ABSTRACT

Architecture for security trimming results in a document version environment. Versioned documents are stored with metadata that includes associated access rights. All versions are searched using multiple user accounts of varying levels of access that correspond to the document versions. Result sets are returned for each user account and trimmed during a merge process by considering the user rights associated with each of multiple versions of objects or documents. Each document metadata includes a scope ID that defines security rights for that document. In a two-version document (major and minor) implementation, successive queries are run as a user with rights to all minor versions, and as a user with rights to all major items, but not the minor items. The result sets are merged into a final trimmed result set by examining the rights to each item in the versioned sets that align with rights of the current user.

20 Claims, 11 Drawing Sheets

OTHER PUBLICATIONS

Godfrey, et al., "Semantic Query Caching for Heterogeneous Databases", Date: Aug. 30, 1997, http://ceur-ws.org/Vol-8/paper-6.ps.

Haas, et al., "Loading a Cache with Query Results", Date: 1999, http://www-dbs.informatik.uni-heidelberg.de/publications/20.pdf.

* cited by examiner

TRIMMED AND MERGED SEARCH RESULT SETS IN A VERSIONED DATA ENVIRONMENT

BACKGROUND

Advances in hardware and software storage systems, networks, and search engines have made the Internet a vast source of information. Network users now have mechanisms for searching and communicating on virtually any topic of interest.

Corporate entities have long recognized the benefits of internal (or enterprise) networks for the communication of information for any desired purpose. Network systems such as web services, once reserved for the Internet, can now be utilized as information access and distribution systems in the corporate environment. Corporate networks can now support collaboration systems, conferencing systems, social networks, etc., where multiple users can login and share information and data of many different types.

In many corporate enterprise content management systems, there can be multiple different versions (e.g., two) of the same document visible at the same time. For example, where two versions are utilized, these document versions can be referred to as checked-in and checked-out, published and unpublished, major and minor, etc. A point is that a single data object (or document) can have multiple different views (e.g., two). Accordingly, queries against the enterprise data store will typically query against the version of the document to which the user has rights. In other words, if the user has rights to the unpublished version, only the unpublished version should be returned. If the unpublished version does not match the query, but the published version does, the published item should not be a part of the result set.

In order to have a performant dynamic enterprise web server application it is desirable to have trimmed result sets available for display to the user. However, in such large environments, there can be multiple authors preparing documents and at different levels. Moreover, users who login are typically restricted to viewing only major (or published) documents or objects, since the query is executed against only major documents. A problem is that there can be many minor documents that also can be of interest to the user.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed innovation facilitates trimmed, merged and ordered search results (e.g., security trimmed) based on the user and user access rights. A data store stores all versions of documents, and is accessed successively as part of searching the versioned documents to return versioned result sets. Successive search processes are performed by impersonating different users over several queries, with each impersonated user having different access rights to the stored data.

In other words, in association with a standard content query for searching all documents for the desired content, additional queries are automatically generated for the user to ensure that not only are all relevant documents returned based on the content, but also related document versions. The search results then are trimmed using user access rights to ensure that only the documents the user is authorized to see and that match that query, are ultimately presented.

In the multi-version document storage environment, corresponding user accounts are automatically generated and searches automatically conducted from each of these accounts against the data store for the query content. Thus, each query under an account can return a versioned result set of documents that also include the query content associated with the search terms. For example, in a two-version implementation (e.g., major and minor document versions), two versions of the query are run-a search as a user having access rights to search term content in all minor versions (referred to as a super user), and one as a user having access rights to search term content in all major items, but not minor items (referred to as a super reader). As two different users, the innovation examines the document metadata to determine which document version should finally be returned. In the two-version example, the final results for the major and minor result sets are merged into a final trimmed result set by examining the rights to each item in the versioned sets that align with the actual rights of the current user (e.g., super user or super reader). A predetermined sort order can also be employed to maintain results ordering when merging into the final results set.

The innovation supports a performant dynamic enterprise web server application. In a data store, each document version has associated therewith metadata that includes a security scope ID which defines the security rights for that document and users assigned those rights (e.g., via an access control list-ACL). The association of the rights with users is checked during the trimming process.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
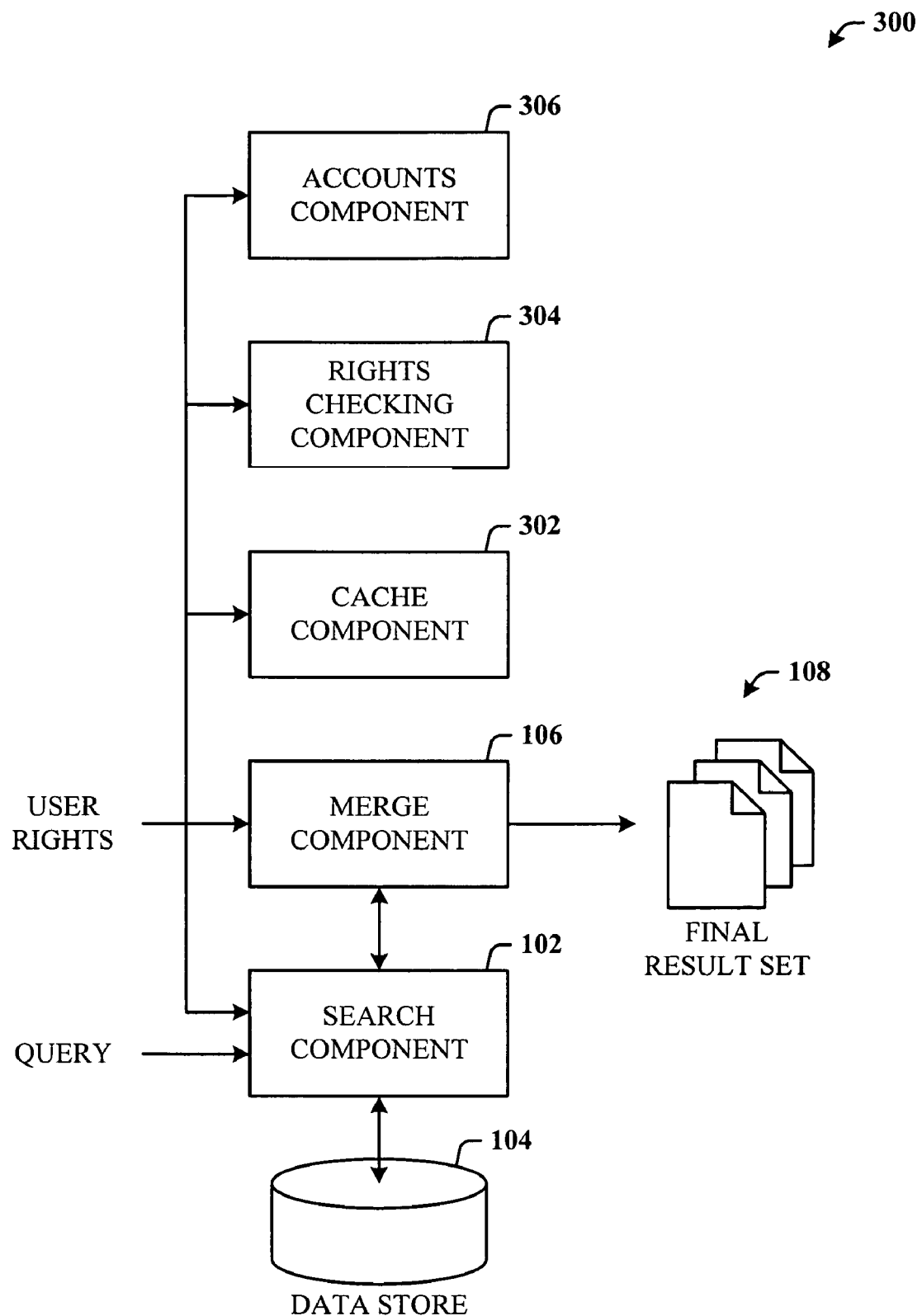
FIG. 1 illustrates a system that facilitates searching documents in accordance with the disclosed innovation.

The innovation provides a mechanism for automatically searching all versioned objects or documents of one or more data stores based not only on content, but also on permission rights of a user initiating the search. If, for example, the system includes three different document versions, the corresponding user accounts are dynamically created, each associated with rights to the three different document versions. The content search is then run successively on the data store from the three different user accounts using permissions associated with the three different users. The intermediate versioned result sets for the three searches can be returned with the results sorted in a particular order. A trimming and merging operation is then performed on the three versioned result sets on an element-by-element basis, and according to the original order, or another predetermined order. A final result set is obtained for presentation to the user. Multiple data stores can be utilized if an authorization token is made common among the data stores, for example.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Referring initially to the drawings, FIG. 1 illustrates a system 100 that facilitates searching documents. The system 100 includes a search component 102 for receiving a query and successively searching content of a data store 104 across document versions based on user access rights. In other words, each document version returned that is a match to the query content can be associated with a different set of user access rights. Note that the terms "search" and "query" and variations thereof are used synonymously herein to include the broader meaning of not only having the capability of searching document content, but also interrogating databases and other data sources. This can be accomplished by storing at least the access rights and users associated with those rights (also referred to herein as scope) in metadata that is associated with each of the document versions.

The search component 102 automatically conducts successive searches of the data store 104 using the different sets of user access rights to ensure that all relevant search term documents are returned. An intermediate result set is returned for each set of different access rights. For example, where there are two document versions (e.g., major and minor) stored on the data store 104, two intermediate result sets will be returned. Moreover, elements of each intermediate result set can be returned in a predetermined order, thereby setting the order for the final result set. Note that the innovation also finds application to implementations where separate queries to the data store 104 for each set of document versions are not required. Additionally, the term "document" as used herein includes not only pages, but page content, and other data and objects such as collaboration lists, for example.

A merge component 106 receives, trims and merges the intermediate result sets into a final result set 108 employing the predetermined order in which the results were returned and using the access rights of the user.

Figure 2:
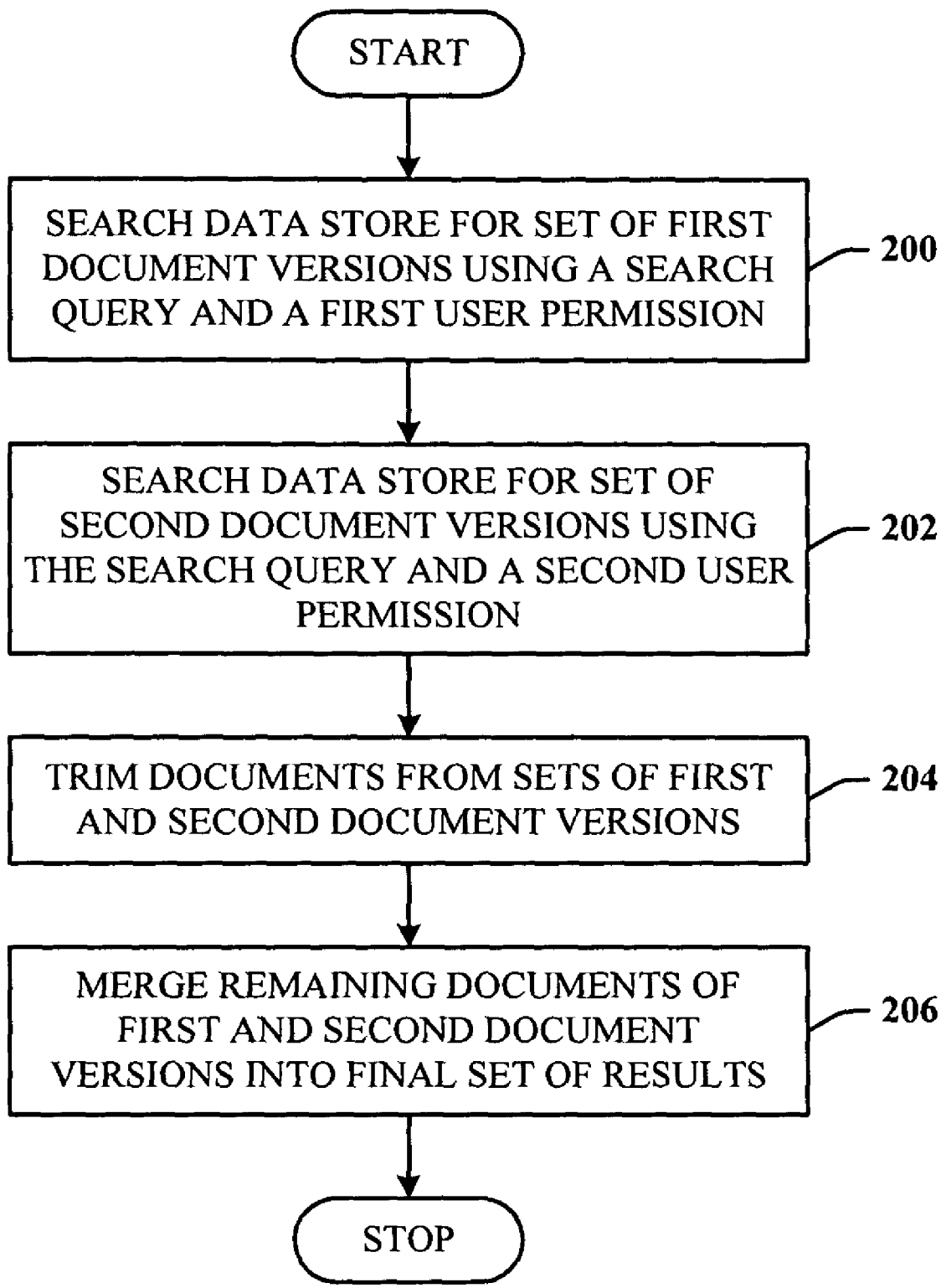
FIG. 2 illustrates a method of searching versioned documents of a data store.

FIG. 2 illustrates a method of searching versioned documents of a data store. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a data store is searched for content contained in a set of first document versions using a search query and a first user permission. At 202, the data store is searched for a set of second document versions using the search query and a second user permission. At 204, the documents from the sets of the first and second document versions are trimmed based on the first and second user permissions. At 206, the remaining documents of the first and second document versions are merged into a final set of search results.

Figure 3:
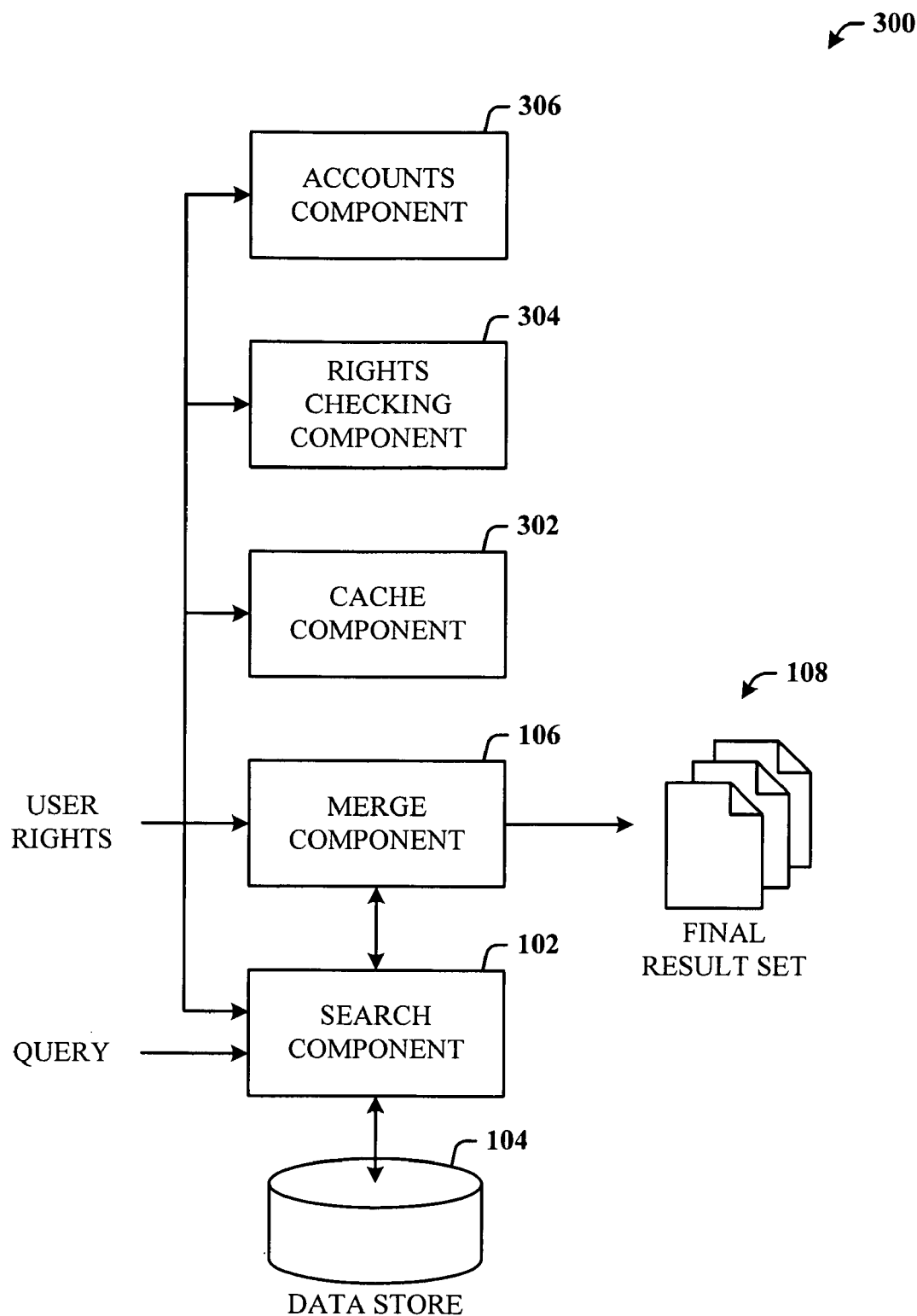
FIG. 3 illustrates an alternative system for searching versioned documents.

Referring now to FIG. 3, there is illustrated an alternative system 300 for searching versioned documents. The system 300 finds particular applicability in an enterprise content management environment. The system 300 includes the search component 102, data store 104, merge component 106, and associated capabilities of each as described in FIG. 1 and elsewhere herein. The data store 104 and associated storage system (not shown) provide the capability to store metadata with each document of the document versions that specifies the rights required to view that document and version (e.g., a minor version).

Additionally, the system 300 can include a cache component 302 that provides the infrastructure for storing multiple versions of a given item (or document) under the same ID (e.g., a URL-uniform resource locator). Caching of the search processes and results (in chip memory) facilitates faster searching and results processing than in persisted data systems (e.g., mass storage magnetic and/or optical storage systems). A rights-checking component 304 includes the infrastructure that allows for checking the current user against an access control list (e.g., an ACL) without incurring the overhead associated with fetching the item, etc.

An accounts component 306 includes the capability to create a first user account for a user that has full rights to a first version of the document versions (e.g., all minor items), the capability to create a second user account for the same user that has full rights to a second version of the document versions (e.g., all major items), and so on, for each stored version of the document. In one implementation, the rights to document versions are non-overlapping (do not intersect) (e.g., only returns major documents or only returns minor documents). In other words, user access rights (or permissions) of the second version will not overlap with user rights to the first version, or any other version, such that searching for the second document versions will not also return the first document versions. In another implementation, rights to document versions can overlap to return multiple document versions (e.g., both major and minor).

The accounts component 306 facilitates the capability to impersonate the users described above. For example, when a search query is created for execution by a single user, the system automatically and dynamically creates user accounts that define access rights for the single user across all document versions. In other words, where the data store 104 includes two document versions (e.g., a minor version and a major version), the system 300 will automatically create user accounts (e.g., as a background process that is transparent to the user) for executing the same query to search for the same content in both document versions.

In a two-version system, a user account that can access minor versions of documents will be referred to herein as a "super user", and a user account that can access major versions of documents will be referred to herein as a "super reader". If the user has already logged into the system 300 as a super reader (with rights only to the major document versions), the system 300 will automatically create a second user account (as a super user) with full rights to the minor document versions, and search the data store 104 for these documents. Accordingly, in general, a given query can be processed by the system 300 in N passes, where N is a positive integer that represents an N number of document versions, and hence, N user accounts created for searching based on the corresponding user rights. In the previous example, two passes are conducted: one impersonating the super user and one impersonating the super reader, since there are two document versions.

The search will return a result set for each document version. For example, where the document version are major and minor, a document result set of minor documents will be returned and a document set for the major documents will be returned. The merge component 106 will then perform merging and trimming of the result sets into the final result set 108 f access by the user and/or user system(s) based on the actual rights of the user. It is to be understood that where a result set is empty, it is possible that, based on actual user access rights, the user will be allowed to see all of the returned documents, or none of the documents.

Figure 4:
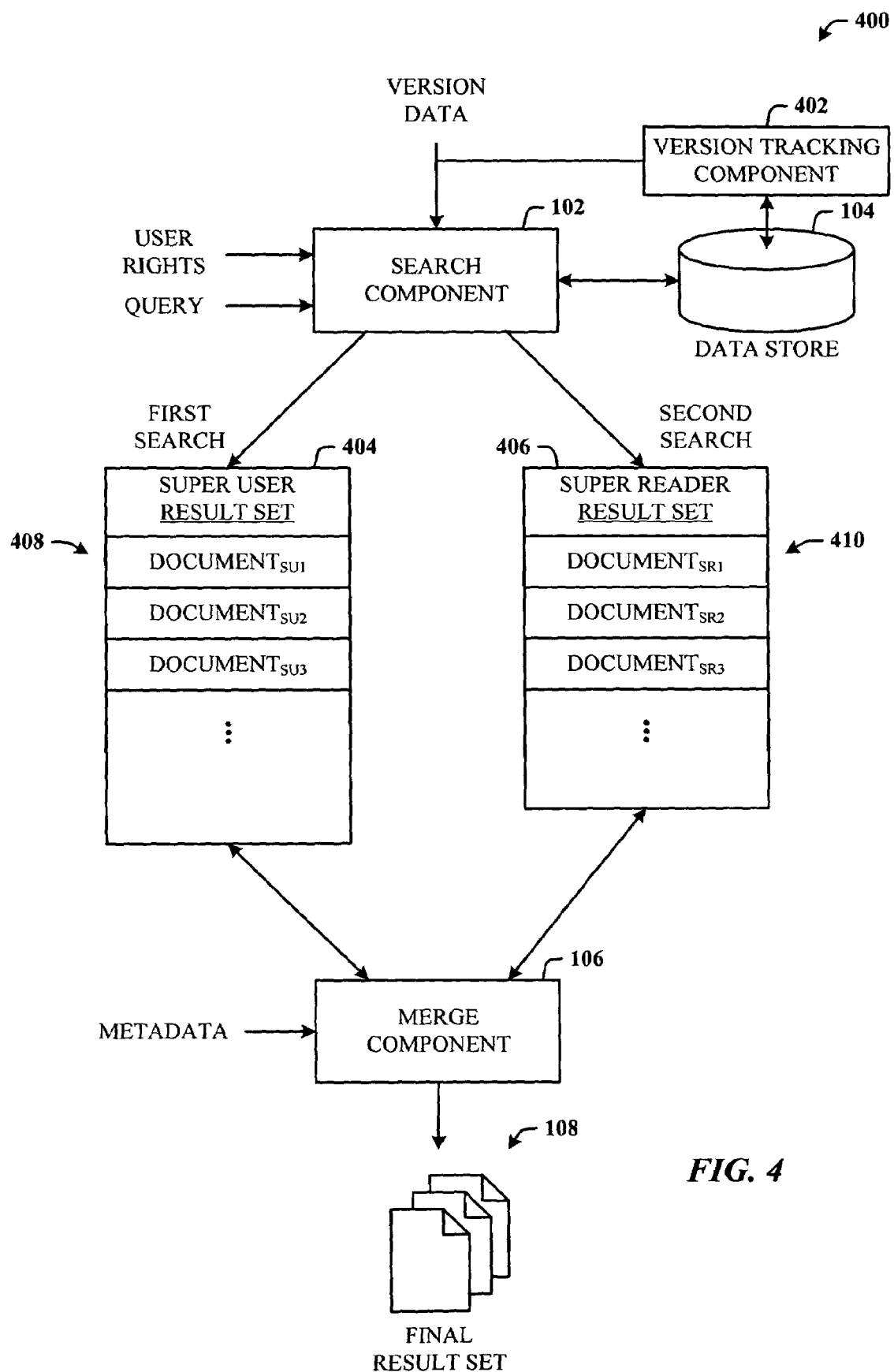
FIG. 4 illustrates a system of query and results processing for a two-document version search process.

FIG. 4 illustrates a system 400 of query and results processing for a two-document version search process. The search component 102 receives as input version data associated with the number of versions of the documents stored on the data store 104, the query to be executed against the data store 104 and user rights information associated with user account(s) generated to process the query. The version information can be known directly by the search component 102 and/or obtained from a version tracking component 402 associated with the data store 104.

In other words, the version tracking component 402 can perform a periodic scan of the data store 104 (or selected portions thereof) for all versions of documents stored therein, and report this version data to the search component 102 to indicate the number of accounts to be created, and hence, the number of search passes to be conducted over the data store 104. Alternatively, or in combination therewith, the version tracking component 402 can also pass the version data to the accounts component (not shown) for account generation. For example, if the scan indicates two versions of all documents, the value of two can be passed to the search component 102 indicating that two passes of the search query will be conducted using two different user accounts and associated user rights information.

Here, two searches are performed over the data store 104 using the same query content terms: a first pass based on a user account as a super user, and a second pass based on a second account as a super reader. The first search yields a first versioned result set 404 and the second search yields a second versioned result set 406. The first result set 404 includes documents 408 (denoted $DOCUMENT_{SU1}$, $DOCUMENT_{SU2}$, $DOCUMENT_{SU3}$, ...) returned according to the search terms and super user rights, and the second result set 406 includes documents 410 (denoted $DOCUMENT_{SR1}$, $DOCUMENT_{SR2}$, $DOCUMENT_{SR3}$, ...) returned according to the search terms and super reader rights.

Note that the returned result sets (404 and 406) need not be the same length (or include the same number of elements). The result sets (404 and 406) are then sent to the merge component 106 for trimming and merge processing based on metadata received from each of the documents (408 and 410) in the result sets (404 and 406). The merge component 106 then outputs the final result set 108.

Once the intermediate result sets have been returned, trimming and merging can be performed. The trimming process will be described in the context of two versioned result sets for the super user and super reader of FIG. 4. However, it is to be understood that more intermediate result sets can be returned based on a correspondingly greater number of document versions.

Initially, result set elements (e.g., documents, document content) will be analyzed and checked against the actual user rights of the current user, beginning with the first (or top) element ($DOCUMENT_{SU1}$ and $DOCUMENT_{SR1}$) from each result set (404 and 406). If the actual rights associated with the current user indicate no rights to either of the top elements ($DOCUMENT_{SU1}$ or $DOCUMENT_{SR1}$), the system ignores these elements, selects the next elements ($DOCUMENT_{SU2}$ and $DOCUMENT_{SR2}$) from each corresponding result set, and performs the same check. This continues in order, until all elements (408 and 410) of both sets (404 and 406) have been checked.

It need not be the case that the algorithm walks through the result sets (404 and 406) comparing elements (or documents) SU1-SR1, then SU2-SR2, then SU3-SR3, etc. It can be true that SU1 and SR1 refer to different versions of the same element in the system. Accordingly, it needs to be determined which of the two (if any) the user should see. It can also be true that SU2 and SR2 refer to different elements in the system; hence, these elements will be reviewed by the trimming/merging code differently. In fact, it is possible that the user should see both versions SU2 and SR2. The final result set for the current user may then include SR1, SU2, SR2 and SU3. Consider six objects where the first letter is the name of the element and the second letter denotes whether the element is a major (M) or minor (m) version.

| | |
|---|---|
| SR1(AM) | SU1(Am) |
| SR2(BM) | SU2(Bm) |
| SR3(CM) | SU3(Cm) |

In this case, there are only three elements in the system: A, B, and C, and each exist in both the major and minor states. The final result set for a reader would be the three elements SR1(AM), SR2(BM) and SR3(CM), while an author would be shown the three elements SU1(Am), SU2(Bm) and SU3(Cm).

However, the result sets could also include the following arrangement:

| | |
|---|---|
| SR1(AM) | SU1(Bm) |
| SR2(CM) | SU2(Dm) |
| SR3(EM) | SU3(Fm) |

In this case, there are six elements in the system: A, B, C, D, E, and F. Three of the elements (A, C and E) only have major versions, and three of the elements (B, D and F) only exist as minor versions. The final result set for a reader would be the three elements SR1 (AM), SR2(CM), and SR3(EM), while the results for an author would be the six elements SR1(AM), SU1(Bm), SR2(CM), SU2(Dm), SR3(EM), and SU3(Fm).

This also means that a combination of the two edge cases described above can occur:

| | |
|---|---|
| SR1(AM) | SU1(Bm) |
| SR2(BM) | SU2(Cm) |
| SR3(DM) | SU3(Dm) |

In this case, there are only four elements in the system: A, B, C, and D. One element (A) exists only as a major, one element (C) exists only as a minor, and two elements (B and D) exist as both major and minor. The final result set for a reader would be the three elements SR1(AM), SR2(BM), and SR3(DM) while the results for an author would be the four elements SR1(AM), SU1(Bm), SU2(Cm), and SR3(DM). Accordingly, it can be appreciated that many different combinations can exist.

Once elements have been found in the intermediate result sets (404 and 406) that allow access to the current user, the actual user rights criteria is processed against the user documents, the correct documents then need to be chosen (based on the sorting method being used) and merged into the final results set.

The sorting process can take into consideration attributes associated with the documents (or data). For example, the data type can be utilized. If text, the locale of the data can be used in the sorting process. Additionally, the time the query was conducted, when the data was last modified and a predefined number of documents to be presented can be used to refine the sorting process. Alternatively, the relevant locale can be associated with a property, condition, etc., that is not tied to the data; for example, with respect to locale preferences of the current user. More generally, other sorting criteria (or trimming criteria) can be employed that are not strictly related to properties of the documents.

Figure 5:
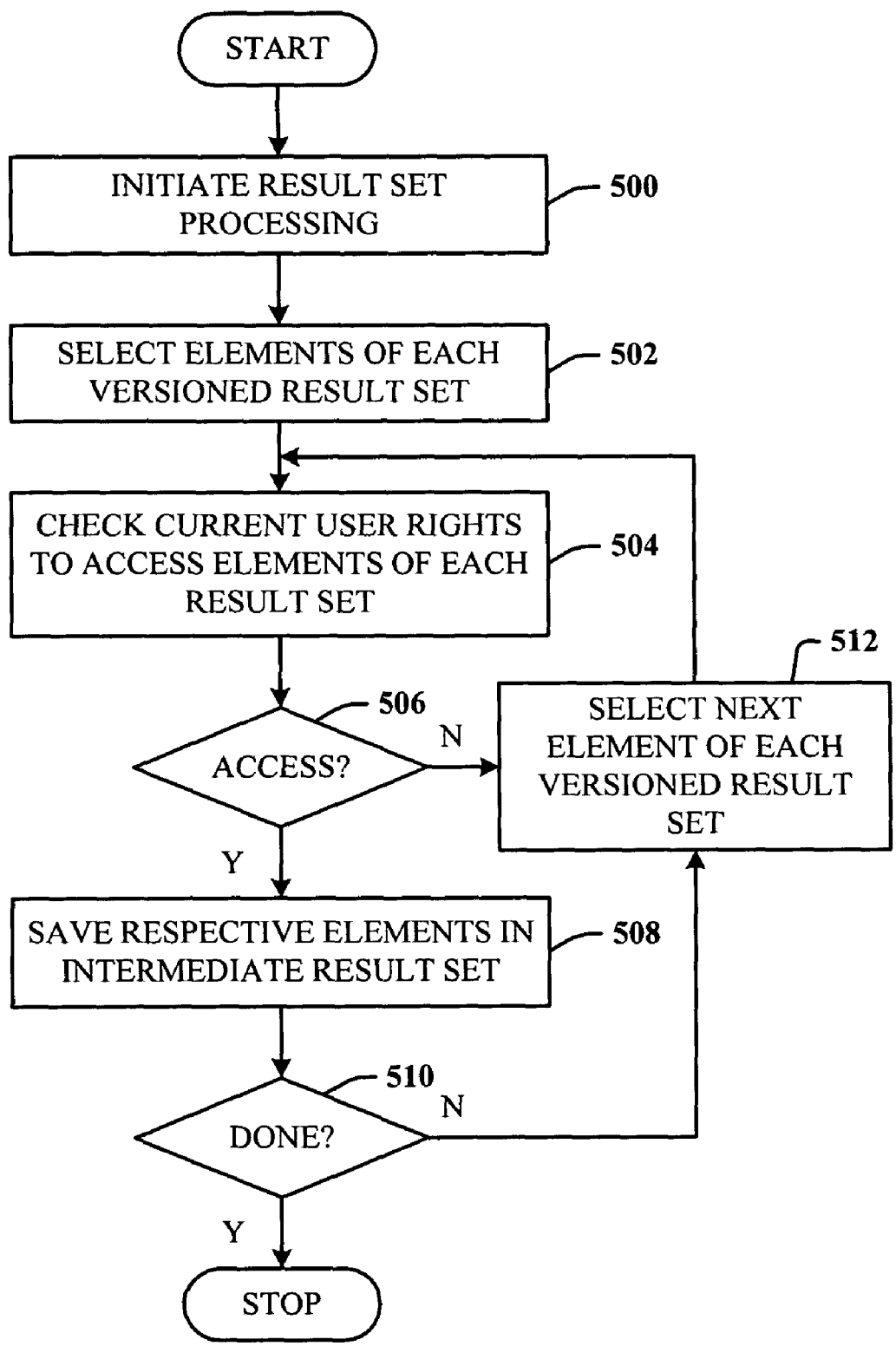
FIG. 5 illustrates a method of processing the versioned result sets in preparation for merging into a final result set.

FIG. 5 illustrates a method of processing the versioned result sets in preparation for merging into a final result set. At 500, result set processing for the result sets is initiated. At 502, an element (e.g., top document) of each of the result sets is selected. At 504, a check is made to determine if the current user has access rights to each of the elements of the respective intermediate result sets. If so, at 506, flow is to 508 to save the respective element(s) in an intermediate result set. A check is then performed to determine if all of the result set elements have been checked. If not, flow is to 512 to select the next elements of the result sets, and flow is back to 504 to again, check the current user rights against the next elements. This process continues until no more elements of the intermediate results need to be checked.

In this particular method, elements are pulled from each intermediate results set in an ordered manner that closely matches the order in which the results were returned. However, it is within contemplation of the innovation that rights processing can first occur for all elements of one intermediate result set, and then followed by all elements of another result set, until all intermediate result sets have been processed. In other words, it is not a restriction that rights processing be performed top-to-bottom or bottom-to-top on an element-by-element basis across all intermediate result sets. For example, it is possible in one application to process only the minor documents returned in the two intermediate result sets.

Figure 6A:
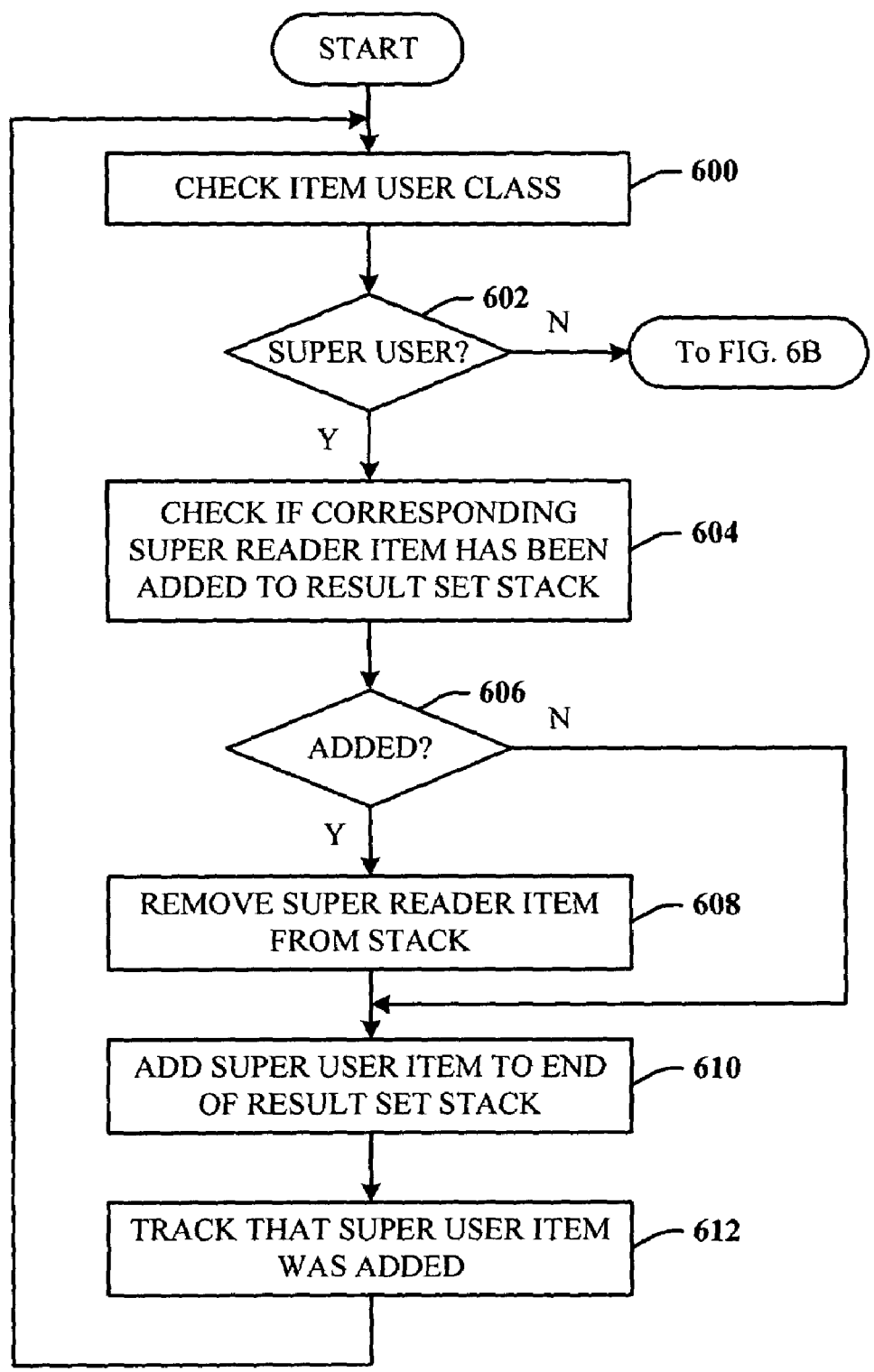
FIG. 6A and FIG. 6B illustrate a method of sorting and merging selected documents into a final result set.
Figure 6B:
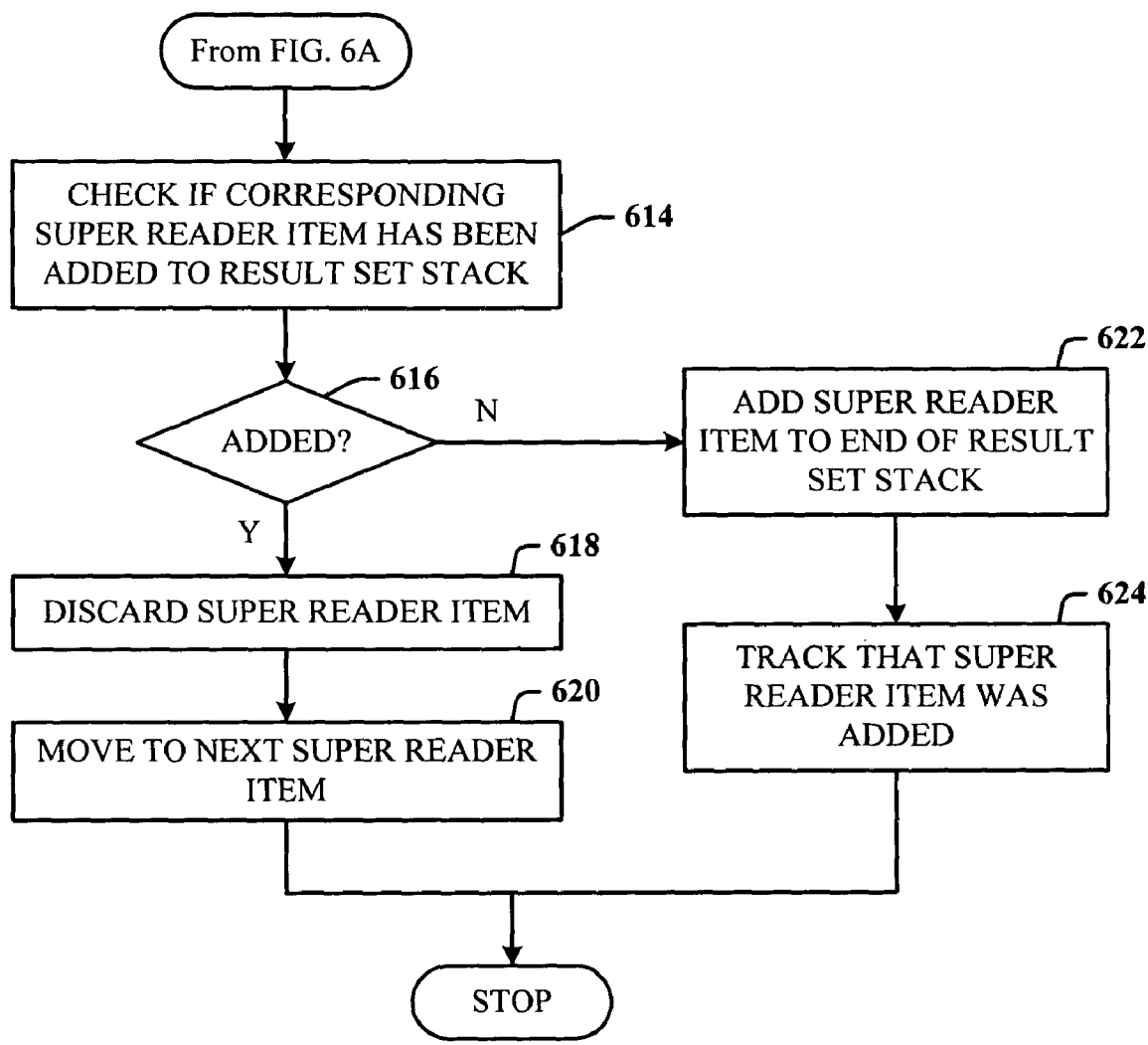

Once elements are selected from the result sets to which the user has access view, merging and sorting are processed. FIG. 6A and FIG. 6B illustrate a method of sorting and merging selected documents into a final result set. At 600, the system checks the item user class. At 602, if the current item is a super user item, flow is to 604 to check if the corresponding super reader item has been added to the result set stack. If so, at 606, the super reader item is removed from the result set, as indicated at 608. At 610, the super user item is then added to the end of the stack. At 612, the addition of the super user item to the stack is tracked. At 606, if the super user item has not been added to the result set stack, flow is to 610, again, to add the super user item to the end of the stack.

At 602, if the current item is not a super user item, but a super reader item, flow is to 614 (of FIG. 6B) to check if the corresponding super reader item has been added to the result set stack. If so, at 616, flow is to 618 to discard the super reader item. At 620, the system then moves to process the next item. If, at 616, the corresponding super user item has not been added, flow is to 622 to add the super reader item to the end of the result set. At 624, the system tracks that the super reader item has been added to the results set stack.

Figure 7:
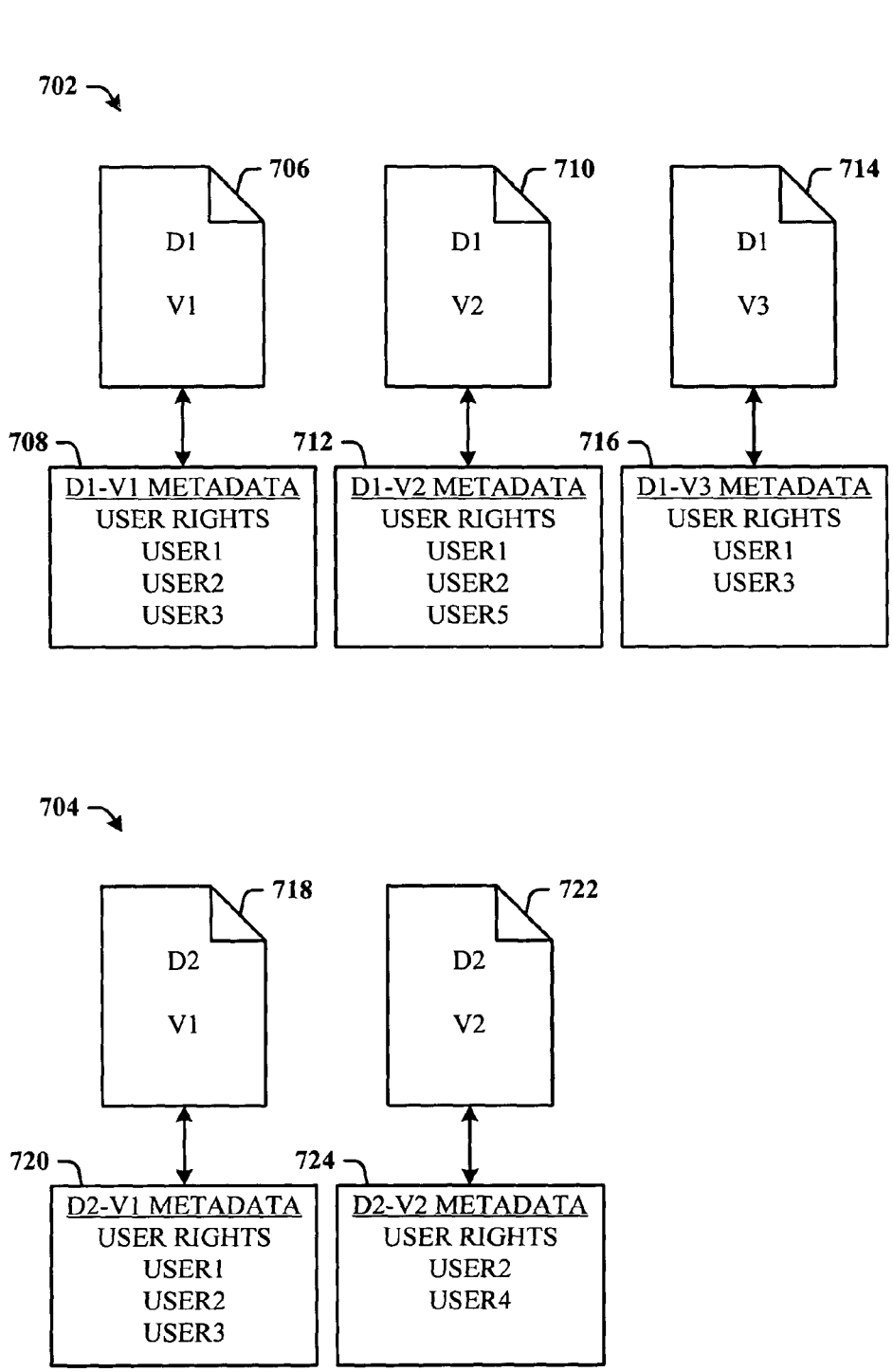
FIG. 7 illustrates documents and metadata that can be associated with sets of documents.

FIG. 7 illustrates documents and metadata that can be associated with sets of documents 700. Here, as a simplistic example, five documents are stored in the data store (or in the portion selected for searching): three versions (V1, V2 and V3) of a first version set 702 associated with a first document (D1), and two versions (V1 and V2) of a second version set 704 associated with a second document (D2).

A first document 706 of the first version set 702 has associated therewith metadata 708, which metadata 708 includes scope information that defines at least users allowed to access that document 706. For example, the first document 706 can be accessed by USER1, USER2 and USER3. Similarly, a second document 710 of the first version set 702 has associated therewith metadata 712, which metadata 712 includes scope information that defines at least the users allowed to access that document 710. For example, the second document 710 can be accessed by USER1, USER2 and USER5. A third document 714 of the first version set 702 has associated therewith metadata 716, which metadata 716 includes scope information that defines at least the users allowed to access that document 714. For example, the third document 714 can be accessed by USER1 and USER3.

A first document 718 of the second version set 704 has associated therewith metadata 720, which metadata 720 includes scope information that defines at least users allowed to access that document 718. For example, the first document 718 can be accessed by USER1, USER2 and USER3. Similarly, a second document 722 of the second version set 704 has associated therewith metadata 724, which metadata 724 includes scope information that defines at least the users allowed to access that document 722. For example, the second document 722 can be accessed by USER2 and USER4.

It is to be understood that the metadata for each of the document versions can contain other information including but not limited to, for example, time and date of creation and last update, document size, format (e.g., word processing, spreadsheet), and type (e.g., video, audio, image), author, last editor name, document ID, and so on.

Figure 8:
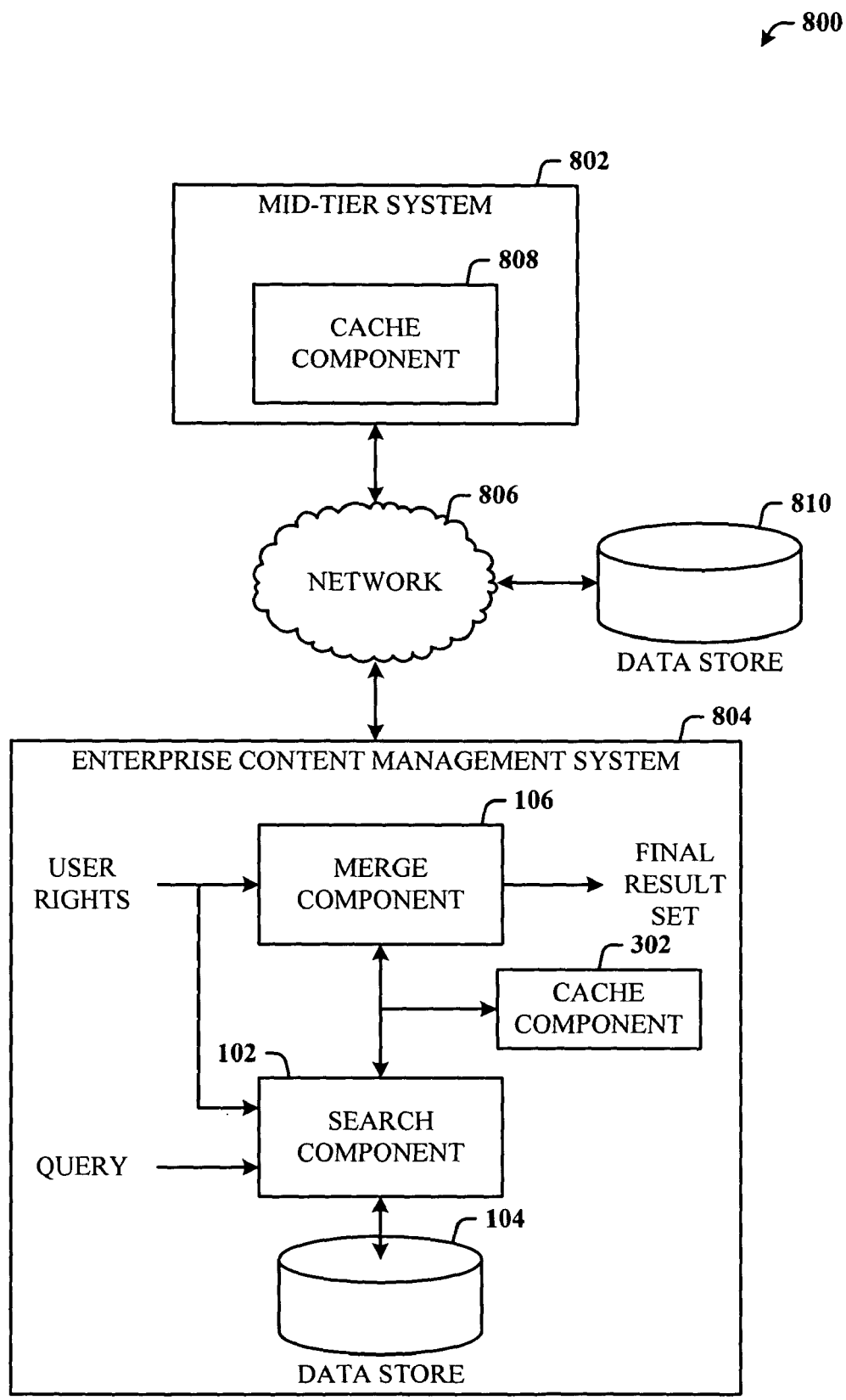
FIG. 8 illustrates implementation of an alternative system where caching can be located at a mid-tier system.

FIG. 8 illustrates implementation of an alternative system 800 where caching can be located at a mid-tier system 802. Here, an enterprise content management system 804 includes the search component 102, merge component 106 and data store 104, the capabilities of which are described herein. In this implementation, the management system 804 also includes the cache component 302 cache operations therein. The management system 804 can communicate over a network 806 to the mid-tier system 802, where further caching capabilities can be provided. A mid-tier cache component 808 can be provided at the mid-tier separately or in combination with the cache component 302 for caching data and search results (e.g., intermediate result sets). The mid-tier cache component 808 can also be employed to cache data from a network-based data store 810 against which searches can be performed. It is within contemplation of the subject innovation that searches can be performed over distributed databases, which can be deployed across the data stores (104 and 810).

In the context of the content management system 804, for example, if the administrator creates a new website and the administrator is the only user allowed in, the administrator will have the same set of rights on every object on the entire system. That is, there will be only one scope. As soon as the administrator give another user the same rights, then both the administrator and the user us can gain access, and both the administrator and the user can operate on everything since the same rights exist on all site documents. If the administrator grants other users a different set of rights such as read-only, for example, and not the ability to change items, then a second scope has been created. Each time a different set of permissions is provided, regardless of the users involved, a different set of objects in the system can be given those permissibrs, thereby creating a new scope.

Additionally, if ten documents are returned as results and five are of a first scope and the remaining five of a second scope, the system can infer the if the user has rights to one document of the items of the first scope the user also has rights to the remaining items of the first scope. Accordingly, no additional time is required to analyze the remaining four documents for that user. This is useful for the trimming process.

It is within contemplation of the innovation that in one alternative implementation, rather than executing multiple separate searches successively from newly-generated user accounts, the search queries can be consolidated (or called) into one search string for execution against all document versions in the data store.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 9:
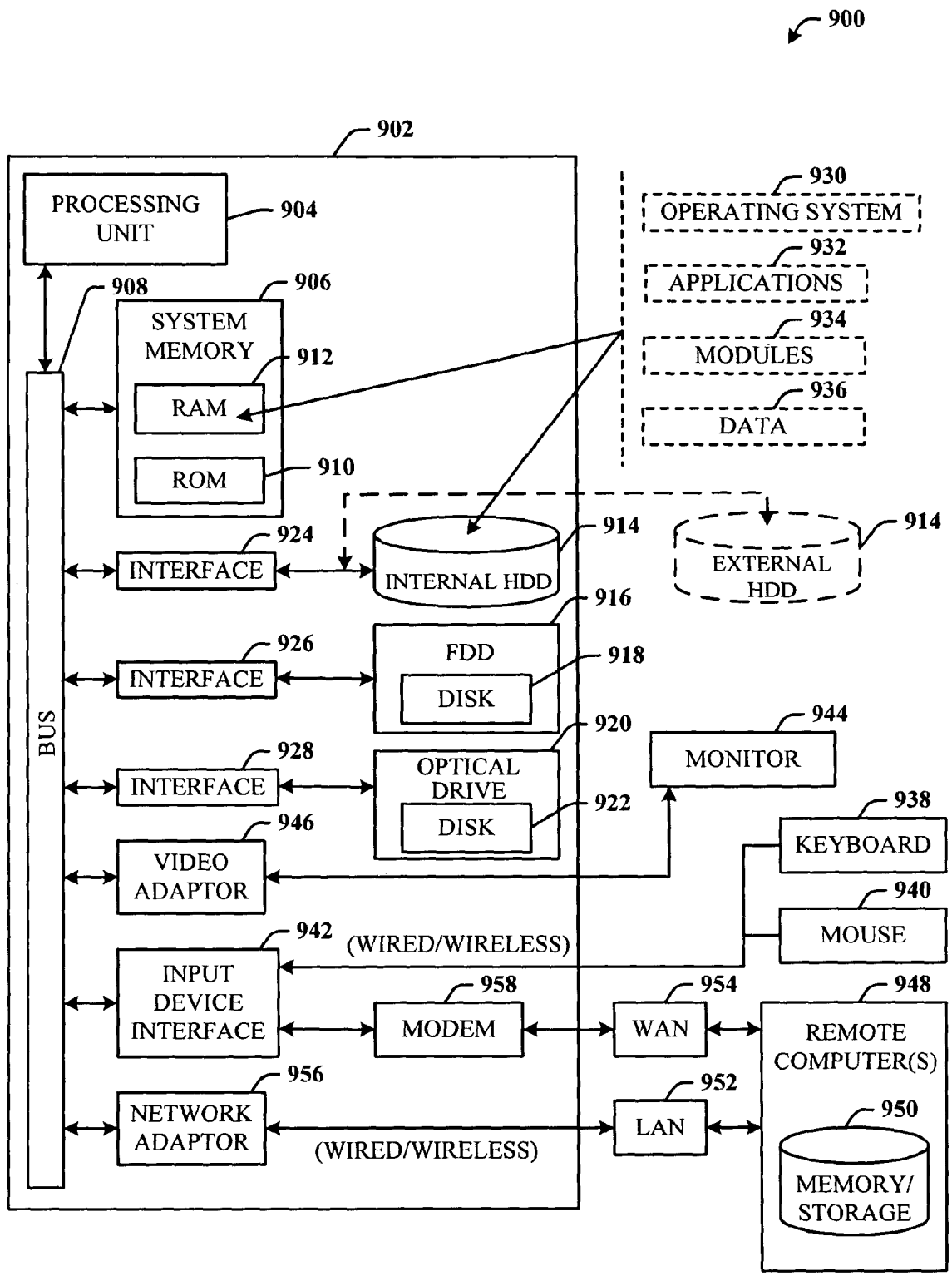
FIG. 9 illustrates a block diagram of a computing system operable to process searches using content and user access rights in accordance with the disclosed architecture.

Referring now to FIG. 9, there is illustrated a block diagram of a computing system 900 operable to process searches using content and user access rights in accordance with the disclosed architecture. In order to provide additional context for various aspects thereof, FIG. 9 and the following discussion are intended to provide a brief, general description of a suitable computing system 900 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary computing system 900 for implementing various aspects includes a computer 902, the computer 902 including a processing unit 904, a system memory 906 and a system bus 908. The system bus 908 provides an interface for system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. The RAM 912 can be used for caching search processes, documents, intermediate result sets, etc., as described herein. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the innovation can be implemented with various commercially available operating systems or combinations of operating systems.

The modules 934 can include the algorithms and/or software components described herein in support of searching, merging, caching, right-checking and accounts, for example, as described herein.

A user can enter commands and information into the computer 902 through one or more wired/wireless input devices, for example, a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 10:
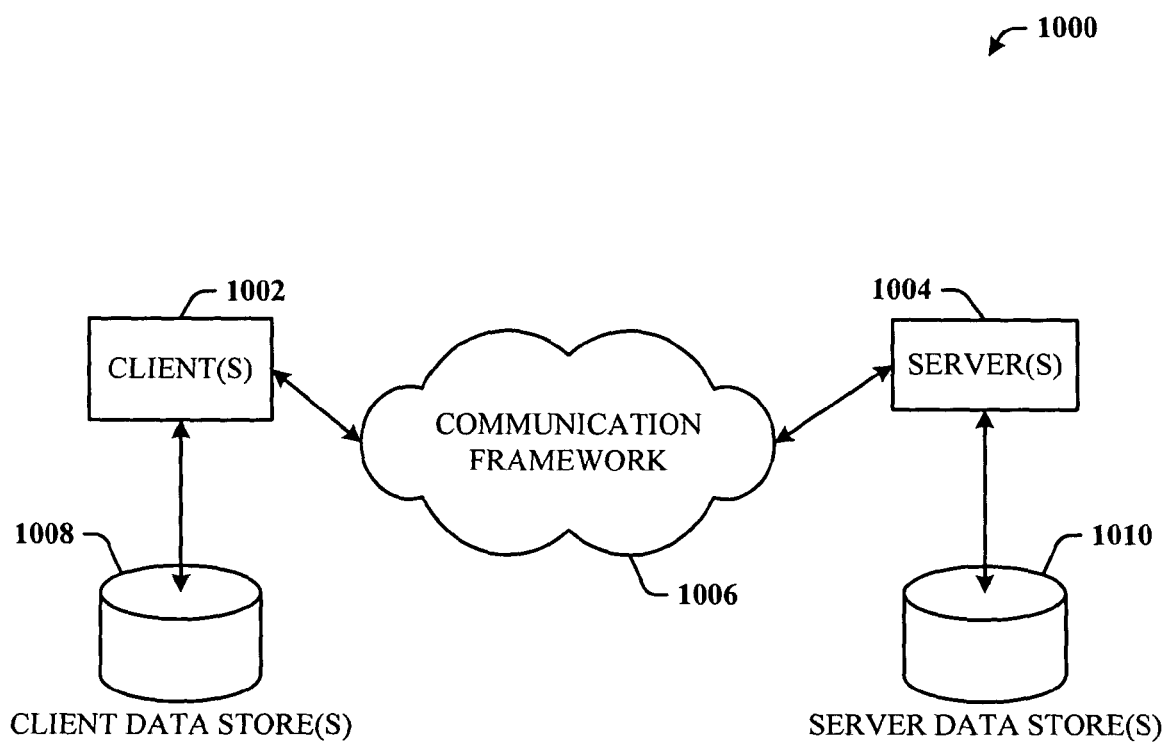
FIG. 10 illustrates a schematic block diagram of an exemplary computing environment that process searches using content and user access rights.

Referring now to FIG. 10, there is illustrated a schematic block diagram of an exemplary computing environment 1000 that process searches using content and user access rights. The system 1000 includes one or more client(s) 1002. The client(s) 1002 can be hardware and/or software (e.g., threads, processes, computing devices). The client(s) 1002 can house cookie(s) and/or associated contextual information by employing the subject innovation, for example.

The system 1000 also includes one or more server(s) 1004. The server(s) 1004 can also be hardware and/or software (e.g., threads, processes, computing devices). One or more of the servers 1004 can host the search and merge components described herein. In the alternative implementation, one of the servers 1004 can host the components illustrated in FIG. 3. The servers 1004 can house threads to perform transformations by employing the architecture, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates document searching, the system comprising a processing unit executing computer-executable program components stored in memory comprising:
   a search component for:
      receiving a query from a user that has logged into the system using a first user account having a first level of user access rights, the query to be used for searching a data store of different document versions, the different document versions including a first version accessible by the first level of user access rights and a second version accessible by a second level of user access rights but not accessible by the first level of user access rights,
      searching for the different document versions according to the first user account used to log into the system and a second user account dynamically created for the user for searching the data store, the dynamically created second user account for the user having the second level of user access rights;
      submitting different versions of the query to the data store in multiple passes corresponding to different levels of user access rights, and
      receiving intermediate search results comprising the different document versions returned in response to the different versions of the query, wherein a first version of the query using the first level of user access rights is submitted to the data store in a first pass to return a first intermediate search result set including one or more first version documents accessed according to the first level of user access rights, and a second version of the query using the second level of user access rights is submitted to the data store in a second pass to return a second intermediate search result set including one or more second version documents accessed according to the second level of user access rights; and
   a merge component for:
      determining actual user access rights of the user, and
      merging the first and second intermediate search result sets into a final result set that is accessible to the user and that includes first version documents and second version documents if it is determined that the actual user access rights of the user include the second level of user access rights.

2. The system of claim 1, wherein the document versions include a major version and a minor version each of which is automatically searched in successive search operations.

3. The system of claim 1, wherein:
   the search component searches for the different document versions according to a third user account dynamically created for the user for searching the data store, the dynamically created third user account for the user having a third level of user access rights;
   the search component submits a third version of the query using the third level of user access rights to the data store in a third pass to return one or more third version documents accessible according to the third level of user access rights;
   the merge component merges third version documents returned in response to the third version of the query into the final result set if it is determined that the actual user access rights of the user include the third level of user access rights; and
   the merge component trims the third version documents returned in response to the third version of the query from the final result set if it is determined that the actual user access rights of the user do not include the third level of user access rights.

4. The system of claim 1, wherein the merge component merges intermediate search result sets returned for each of the document versions in an order in which elements of the results are returned.

5. The system of claim 1, wherein the search component examines metadata associated with each of the document versions, the metadata including the user access rights to a given document version.

6. The system of claim 1, further comprising a cache component for storing the versions under a same ID.

7. The system of claim 1, further comprising rights-checking component for checking a user against an access list.

8. The system of claim 1, further comprising an accounts component for dynamically creating a plurality of user accounts for the user, each user account having a level of access rights corresponding to a different version of the document versions to be searched.

9. The system of claim 8, wherein the accounts component facilitates impersonation of an administrator for searching the data store.

10. A computer-implemented method of searching documents, comprising:
   receiving, at a computing device, a query from a user that has logged into a computer system using a first user account having a first level of user permissions, the query to be executed against a data store including different document versions, the different document versions including a first version accessible by the first level of user permissions and a second version accessible by a second level of user permissions but not accessible by the first level of user permissions;
   dynamically creating a second user account for the user having the second level of user permissions;
   searching for the different document versions according to the first user account used to log into the system and the dynamically created second user account for the user;
   submitting different versions of the query to the data store in at least two passes corresponding to different levels of user permissions;
   receiving intermediate search results comprising the different document versions returned in response to the different versions of the query, wherein a first version of the query using the first level of user permissions is submitted to the data store in a first pass to return a first intermediate search result set including one or more first version documents accessed according to the first level of user permissions, and a second version of the query using the second level of user permissions is submitted to the data store in a second pass to return a second intermediate search result set including one or more second version documents accessed according to the second level of user permissions;
   determining actual user permissions of the user; and merging the first and second intermediate search result sets into a final result set that is accessible to the user and that includes first version documents and second version documents if it is determined that the actual user permissions of the user include the second level of user permissions.

11. The method of claim 10, further comprising merging the first and second intermediate search result sets in an order in which elements of search results are received.

12. The method of claim 10, further comprising:
dynamically creating a third user account for the user having a third level of user permissions;
submitting a third first version of the query using the third level of user permissions in a third pass for searching the data store for one or more third version documents accessible according to the third level of user permission;
merging third version documents returned in response to the third version of the query into the final result set if it is determined that the actual user permissions of the user include the third level of user permissions; and
trimming the third version documents returned in response to the third version of the query from the final result set if it is determined that the actual user permissions of the user do not include the third level of user permissions.

13. The method of claim 10, wherein searching for the first and second versions of the document versions is performed successively as part of one overall search process.

14. The method of claim 10, further comprising automatically creating a plurality of user accounts for the user that correspond to searching for the first version and searching for the second version.

15. The method of claim 10, further comprising examining metadata associated with each different document version to determine which document versions are returned in the final set.

16. The method of claim 10, further comprising processing the actual user permissions of the user against the first and second levels of user permissions to determine which document versions are presented to the user.

17. The method of claim 10, further comprising impersonating an administrator for searching the data store for the second version documents.

18. The method of claim 10, further comprising sorting documents in the final result set according to a predetermined order.

19. The method of claim 10, further comprising sorting the documents in the final result set based on data type.

20. A computer-readable storage medium storing computer-readable instructions that when executed cause a computing device to perform a computer-implemented method, the computer-implemented method comprising:
receiving a query from a user that has logged into a computer system using a first user account having a first level of user permissions, the query to be executed against a data store including different document versions, the different document versions including a first version accessible by the first level of user permissions and a second version accessible by a second level of user permissions but not accessible by the first level of user permissions;
dynamically creating a second user account for the user having the second level of user permissions;
searching for the different document versions according to the first user account used to log into the system and the dynamically created second user account for the user;
submitting different versions of the query to the data store in multiple passes corresponding to different levels of user permissions;
receiving intermediate search results comprising the different document versions returned in response to the different versions of the query, wherein a first version of the query using the first level of user permissions is submitted to the data store in a first pass to return a first intermediate search result set including one or more first version documents accessed according to the first level of user permissions, and a second version of the query using the second level of user permissions is submitted to the data store in a second pass to return a second intermediate search result set including one or more second version documents accessed according to the second level of user permissions;
determining actual user permissions of the user; and
merging the first and second intermediate search result sets into a final result set that is accessible to the user and that includes first version documents and second version documents if it is determined that the actual user permissions of the user include the second level of user permissions.

* * * * *